(12) United States Patent
Kijima et al.

(10) Patent No.: US 7,074,548 B2
(45) Date of Patent: Jul. 11, 2006

(54) APPARATUS AND METHOD FOR FORMING THIN-FILM

(75) Inventors: Takeshi Kijima, Matsumoto (JP); Eiji Natori, Chino (JP); Mitsuhiro Suzuki, Tokyo (JP)

(73) Assignees: Seiko Epson Corporation, Tokyo (JP); Youtec Co., Ltd., Nagareyama (JP)

( * ) Notice: Subject to any disclaimer, the term of this patent is extended or adjusted under 35 U.S.C. 154(b) by 273 days.

(21) Appl. No.: 10/376,253

(22) Filed: Mar. 3, 2003

(65) Prior Publication Data

US 2004/0033318 A1    Feb. 19, 2004

(51) Int. Cl.
*B05D 3/00* (2006.01)
*B05D 3/06* (2006.01)

(52) U.S. Cl. ............... 430/322; 427/551; 427/481; 427/484; 427/485; 427/560; 430/330

(58) Field of Classification Search ............... 430/322, 430/330; 427/481, 484, 485, 560
See application file for complete search history.

(56) References Cited

U.S. PATENT DOCUMENTS 6,290,865 B1 * 9/2001 Lloyd et al. ............... 216/92
6,806,183 B1 * 10/2004 Kang et al. ............... 438/627
2003/0020157 A1 * 1/2003 Natori et al. ............... 257/703
2003/0047533 A1 * 3/2003 Reid et al. ............... 216/24
2003/0059544 A1 * 3/2003 Bravo-Vasquez et al. ............... 427/385.5

* cited by examiner

*Primary Examiner*—John A. McPherson
*Assistant Examiner*—Daborah Chacko-Davis
(74) *Attorney, Agent, or Firm*—Oliff & Berridge, PLC

(57) ABSTRACT

A method of forming a thin-film including a capability to remove contaminants from the formed thin-film and/or a substrate on which the thin-film is formed using alcohol. The method includes allowing a substrate holder to support a substract. A first mixture is produced by mixing a condensation polymer containing an element of metal oxide compound and alcohol. Then second mixture is produced by mixing supercritical fluid or liquid carbon dioxide and the first mixture. A thin film is formed by applying the second mixture on a surface of the substrate. After forming the thin-film, the substrate is cleaned by applying alcohol to upper and lower surfaces, preferably the whole upper and lower surfaces, of the substract. The thin-film is crystallized by heating, and the crystallizing may include applying oxygen in a crystallizing chamber. Soft X-rays may be applied to the substrate, during the forming of the thin-film on the surface of the substrate.

4 Claims, 7 Drawing Sheets

(1) HYDROLYSIS (2) BIMOLECULAR CONDENSATION

LINEAR CONDENSATION POLYMERIZATION

APPARATUS AND METHOD FOR FORMING THIN-FILM

TECHNICAL FIELD

The present invention relates to an apparatus and method for forming a thin-film using raw material fluid containing alcohol, supercritical fluid or liquid, and a condensation polymer containing an element of a target metal oxide compound.

BACKGROUND ART

In cleaning systems removing contaminants from electronic components, a technique utilizing supercritical carbon dioxide is used. A cleaning system of this type includes a washing chamber for treating a cleaning object, a separating chamber for separating removed contaminants and carbon dioxide, and a pumping member for pumping supercritical carbon dioxide fluid. The cleaning object is placed in the washing chamber, carbon dioxide fluid pressurized to a predetermined pressure is fed thereto, and contaminants adhering to the cleaning object are extracted into the carbon dioxide fluid. The resulting carbon dioxide fluid containing the contaminants is introduced into the separator, and the separating chamber is then decompressed to a predetermined pressure to separate the contaminants and the carbon dioxide fluid. The carbon dioxide fluid is recycled, and the cleaning object is retrieved from the washing chamber after the pressure of the washing chamber is decreased, thereby finishing this cleaning treatment.

As described above, such a technique in which supercritical carbon dioxide is used for cleaning electronic components has been conventionally known. The inventors have conducted intensive research on using supercritical fluid such as supercritical carbon dioxide in other applications. As a result, the inventors developed an apparatus and method for forming a thin-film using supercritical fluid.

A sol-gel solution and so on, which are used for forming a metal oxide thin-film by a spin coating process or the like, contain an alcohol solvent such as n-butylalcohol having a relatively large molecular weight and low volatility such that the solution can be preserved for a long term. This is because a change in composition and a change in thickness caused by the vaporization of the alcohol solvent are prevented as much as possible. On the other hand, there is a problem that carbon, which is a main component of the alcohol solvent, remains in an obtained metal oxide thin-film because the alcohol solvent has a relatively large molecular weight and low volatility.

The present invention has been made in order to solve the above problems. It is an object of the present invention to provide an apparatus and method for forming a thin-film using raw material fluid containing supercritical fluid or liquid and raw materials for such a thin-film.

DISCLOSURE OF INVENTION

In order to solve the above problems, an apparatus of the present invention, used for forming a thin-film using raw material fluid containing alcohol, supercritical fluid or liquid carbon dioxide, and a condensation polymer containing an element of a target metal oxide compound, includes a substrate holder for retaining a substrate, a film-forming chamber for housing the substrate holder, a feeding means for feeding the raw material fluid to the substrate surface, and a heater for heating the substrate retained to the substrate holder.

According to the above film-forming apparatus, the raw material fluid containing supercritical fluid or liquid carbon dioxide and a film ingredient is fed to the substrate surface to form a thin-film on the substrate.

In the present invention, a condensation polymer containing an element of a target metal oxide compound is dissolved in alcohol, such as methanol or ethanol, having a small molecular weight (a small carbon content) and high volatility. If the metal oxide element is insoluble, a raw material solution containing a sufficient amount of the element of the target metal oxide compound can be prepared using the supercritical fluid having high dissolving ability. Since this raw material solution is used for forming a metal oxide thin-film just after the preparation thereof, the composition and the thickness are prevented from changing even if such alcohol, such as methanol or ethanol, having high volatility is used. Furthermore, the alcohol, such as methanol or ethanol, having high volatility can be used as a solvent, a desired metal oxide thin-film can be formed in such a manner that carbon, which is a main element of alcohol such as methanol or ethanol, is prevented from remaining in the obtained thin-film.

An apparatus of the present invention, used for forming a thin-film using raw material fluid containing a metal alkoxide containing an element of a target metal oxide compound, a known quantity of water for partially hydrolyzing the metal alkoxide, alcohol, and supercritical fluid, includes a substrate holder for retaining a substrate, a film-forming chamber for housing the substrate holder, a feeding means for feeding the raw material fluid to the substrate surface, and a heater for heating the substrate retained to the substrate holder.

In an apparatus according to the present invention, the film-forming chamber includes a substrate-housing portion for housing the substrate holder for retaining the substrate and a channel-housing portion for housing a channel, connected to the substrate-housing portion, for feeding the raw material fluid to the substrate.

An apparatus according to the present invention may further include a rotating means for rotating the substrate holder. Thereby, a procedure of forming a film portion on part of the substrate surface is repeated to finally form a thin-film over the substrate surface.

An apparatus according to the present invention may further include an ultrasonic generator for applying ultrasonic vibration to at least one of the feeding means and the substrate holder. Thereby, the thin-film formed on the substrate can be crystallized at a low temperature.

An apparatus according to the present invention may further include an ultraviolet generator for applying ultraviolet rays to the substrate retained to the substrate holder or a soft X-ray generator for applying soft X-rays to the same. Thereby, the thin-film formed on the substrate can be crystallized at a low temperature.

In an apparatus according to the present invention, it may include fluid container for containing the supercritical fluid or liquid carbon dioxide; a film ingredient container 1 for containing a metal alkoxide functioning as a film ingredient; a film ingredient container 2 for containing a known quantity of water for partially hydrolyzing the metal alkoxide; an alcohol container for containing alcohol; a mixer connected to the fluid container, the film ingredient container 1, the film ingredient container 2, and the alcohol container; and a nozzle, connected to the mixer and disposed in the film-forming chamber, for spraying the film ingredient.

An apparatus according to the present invention may further include a first temperature control means for controlling the fluid container and a second temperature control means for controlling the mixer.

In an apparatus according to the present invention, the alcohol is preferably methanol or ethanol.

An apparatus of the present invention, used for forming a thin-film using raw material fluid containing a condensation polymer containing an element of a target metal oxide compound, alcohol, and supercritical fluid or liquid carbon dioxide, includes a film-forming chamber; a first substrate holder, housed in the film-forming chamber, for retaining a substrate; a feeding means for feeding the raw material fluid to a surface of the substrat retained to th first substrate holder; a crystallization chamber connected to the film-forming chamber; a second substrate holder, housed in the crystallization chamber, for retaining the substrate; and a heater for heating the substrate retained to the second substrate holder.

A method for forming a thin-film using the film-forming apparatus according to claim 1 including the steps of allowing the substrate holder to support a substrate; mixing a condensation polymer and alcohol, mixing the mixture with supercritical fluid or liquid carbon dioxide to prepare raw material fluid, and then applying the raw material fluid to the substrate surface to form a thin-film on the substrate, using the feeding means; and heat-treating the substrate with the heater.

In the film-forming method according to the present invention, the raw material fluid is sprayed while ultrasonic vibration is applied to at least one of a nozzle and the substrate holder in the thin-film-forming step.

According to the above film-forming method, the raw material fluid containing the supercritical fluid and a film ingredient is sprayed on the substrate surface from the nozzle to form the thin-film on the substrate. When ultrasonic vibration is applied to the nozzle while the raw material fluid is sprayed from the nozzle, the nozzle can be prevented from being plugged with the film ingredient, thereby constantly feeding the film ingredient. Furthermore, when ultrasonic vibration is applied to the substrate holder such that the ultrasonic vibration is transmitted to the substrate while the raw material fluid is sprayed from the nozzle, a crystal is allowed to uniformly grow on the substrate surface, thereby obtaining a high-performance thin-film.

The film-forming method according to the present invention may further include the step of applying ultraviolet rays or soft X-rays to the thin-film, wherein this step is arranged between the thin-film-forming step and the heat-treating step. Thereby, the thin-film can be crystallized at a low temperature.

In the film-forming method according to the present invention, the heat-treating step includes the sub-step of heating the substrate to a first temperature to vaporize alcohol lying on the substrate, the sub-step of heating the substrate to a second temperature higher than the first temperature, and the sub-step of heating the substrate to a third temperature higher than the second temperature. The first temperature is, for example, about 150° C., the second temperature is, for example, about 400° C., and the third temperature is, for example, about 600° C.

BRIEF DESCRIPTION OF THE DRAWINGS

FIG. 7($b$) is an illustration showing a ferroelectric property of a condensation polymer, prepared by mixing an SBT condensation polymer and a BSO condensation polymer at the ratio of 1:1, for forming a ferroelectric thin-film.

BEST MODE FOR CARRYING OUT THE INVENTION

Embodiments of the present invention will now be described with reference to the accompanying drawings.

Figure 1:
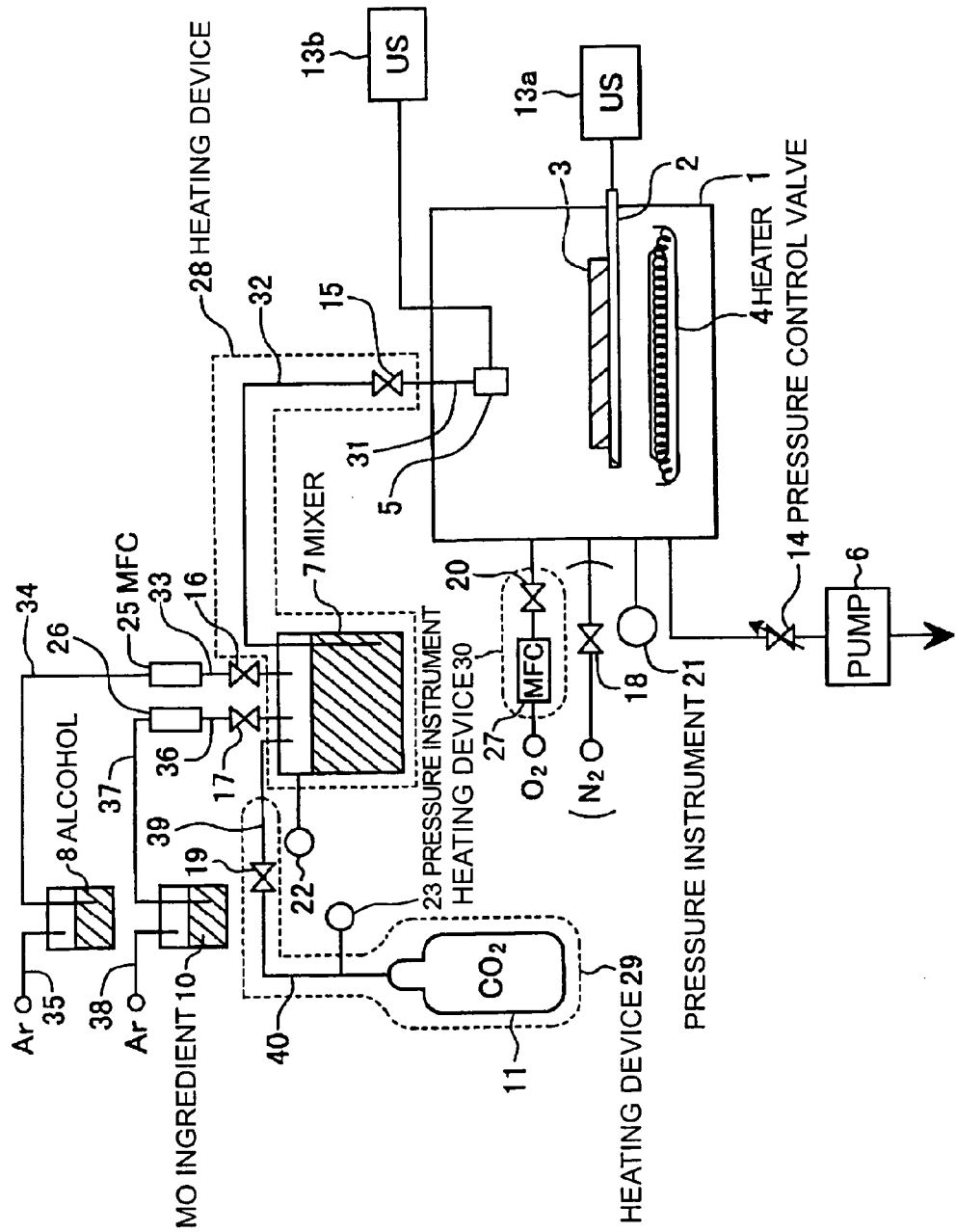
FIG. 1 is a schematic view showing a configuration of a film-forming apparatus according to a first embodiment of the present invention.

FIG. 1 is a schematic view showing a configuration of a film-forming apparatus according to a first embodiment of the present invention. In this film-forming apparatus, a sol-gel method is used.

The film-forming apparatus includes a film-forming chamber 1, and this film-forming chamber 1 contains a substrate holder 2 for retaining a substrate 3. The film-forming chamber 1 further contains a lamp heater 4, disposed below the substrate holder 2, for heating the substrate holder 2. The lamp heater 4 is used for crystallizing a thin-film formed on the substrate 3, and thereby film formation and crystallization can be successively performed in the chamber. The lamp heater 4 need not be arranged below the substrate holder 2 and may be arranged at another location in the vicinity of the substrate holder 2.

The film-forming chamber 1 further includes a nozzle 5 disposed above the substrate holder 2. The nozzle 5 is used for spraying raw material fluid containing alcohol, fluid in a supercritical state (supercritical fluid), and a condensation polymer containing an element of a target metal oxide compound.

The nozzle 5 is connected to an ultrasonic generator 13$b$. The ultrasonic generator 13$b$ provides ultrasonic vibration to the nozzle 5, thereby preventing the nozzle 5 from being plugged with raw materials. The substrate holder 2 is connected to another ultrasonic generator 13$a$. This ultrasonic generator 13$a$ provides ultrasonic vibration to the substrate 3, thereby performing crystallization at low temperature. Various devices generating ultrasound can be used as these ultrasonic generators 13$a$ and 13$b$.

The film-forming chamber 1 is connected to a vacuum pump 6 via a pressure control valve 14. The film-forming chamber 1 is decompressed with the pressure control valve 14 and the vacuum pump 6. The film-forming chamber 1 is further connected to a pressure instrument 21 for measuring the pressure of the film-forming chamber 1. The film-forming chamber 1 is further connected to a nitrogen cylinder via a valve 18. Nitrogen gas is fed to the film-forming chamber 1 from this nitrogen cylinder to purge contaminants from the film-forming chamber 1.

Furthermore, the film-forming chamber 1 is connected to an oxygen cylinder via pipes, another valve 20, and a mass flow controller (MFC) 27. These pipes, the mass flow controller 27, and the valve 20 commonly have a heating means 30 for heating these portions. Oxygen gas is fed to the film-forming chamber 1 from the oxygen cylinder in such a manner that the flow rate of the oxygen gas is controlled with the mass flow controller 27 and the oxygen gas is heated with the heating means 30.

The nozzle 5 is connected to another valve 15 via a siphon tube 31, and this valve 15 is connected to a mixer 7 via a siphon tube 32. The mixer 7, the siphon tube 32, and the valve 15 commonly have another heating means (temperature-adjusting means) 28.

The mixer 7 is connected to another valve 16 via a pipe, and this valve 16 is connected to another mass flow controller (MFC) 25 via another pipe 33. The mass flow controller 25 is connected to an alcohol container 8 storing alcohol via another pipe 34. The alcohol container 8 is connected to an Ar cylinder containing Ar gas via another pipe 35.

The mixer 7 is further connected to another valve 17 via a pipe, and this valve 17 is connected to another mass flow controller (MFC) 26 via another pipe 36. The mass flow controller 26 is connected to an MO ingredient container 10 storing a film ingredient (metal organic (MO) ingredient) via another pipe 37. The MO ingredient container 10 is connected to another Ar cylinder containing Ar gas via another pipe 38.

The mixer 7 is further connected to another valve 19 via another siphon tube 39, and this valve 19 is connected to a $CO_2$ cylinder 11 containing supercritical $CO_2$ fluid via another siphon tube 40. This siphon tube 40 is connected to another pressure instrument 23 for measuring the pressure of this tube. The mixer 7 is further connected to another pressure instrument 22 for measuring the pressure of this mixer.

The $CO_2$ cylinder 11, the siphon tubes 39 and 40, and the valve 19 commonly have another heating means (temperature-adjusting means) 29. In particular, the $CO_2$ cylinder 11 and so on are covered with a planer heater (not shown) and are heated with this planer heater.

The film-forming apparatus further includes a control section (not shown). This control section is used for controlling the timing of spraying raw material fluid, the quantity of spraying the raw material fluid, the operation of the ultrasonic generators 13a and 13b, the timing of turning on and off the lamp heater 4, and so on. The control section is used for controlling the film-forming apparatus such that a film-forming method described below can be performed.

Supercritical fluid will now be described with reference to FIG. 2.

Figure 2:
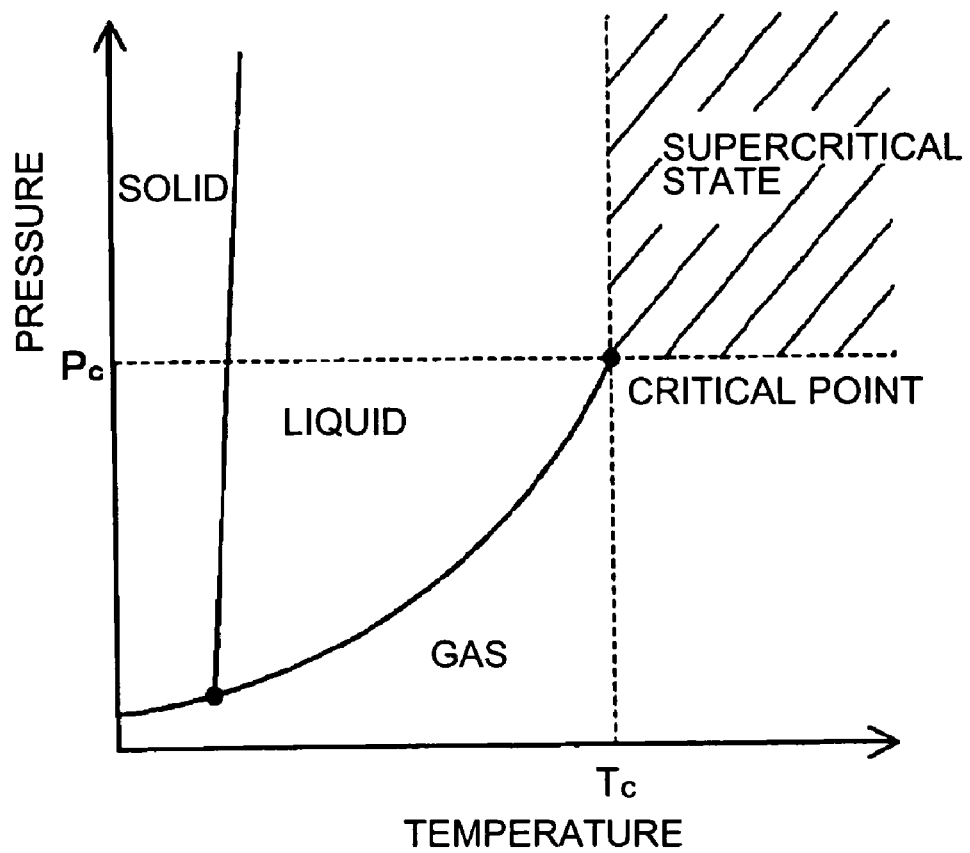
FIG. 2 is a phase diagram of a substance showing the relationship between temperature and pressure.

FIG. 2 is a phase diagram of a substance showing the relationship between temperature and pressure.

It is known that there are three physical states of matter: gas, liquid, and solid. In addition to these states, there is the fourth state called a supercritical state. As shown in FIG. 2, vapor can be liquefied at a temperature lower than the critical temperature $T_c$ inherent in a substance by pressurizing the vapor to a certain pressure. Beyond the critical point, the phase boundary between gas and liquid disappears, that is, liquefaction cannot occur and noncondensable gas having a high density exists. Supercritical fluid is defined as fluid that exists at a pressure and a temperature higher than the critical pressure $P_c$ and the critical temperature $T_c$, respectively. For example, at the critical point of carbon dioxide, the critical temperature is 31.0° C. and the critical pressure is 7.38 MPa. Carbon dioxide existing at a pressure and a temperature higher than the critical pressure and the critical temperature, respectively, is called supercritical carbon dioxide.

The nature of solvents is due to interaction among the molecules, and the intensity strongly depends on the intermolecular distance. Thus, in a liquid solvent the density of which does not significantly change, the intermolecular distance hardly changes. In contrast, in supercritical fluid, the density can be continuously varied from a small value close to the density of gas to a large value close to the density of liquid. This means that the dissolving ability of such supercritical fluid can be increased or decreased by varying the density, because the dissolving ability of a substance depends on the density. Since the density of the supercritical fluid depends on temperature and pressure, the dissolving ability can be controlled by varying the temperature and pressure of the supercritical fluid. For other properties, the supercritical fluid has a large diffusion coefficient and a small viscosity, which are excellent in mass transfer.

Figure 3:
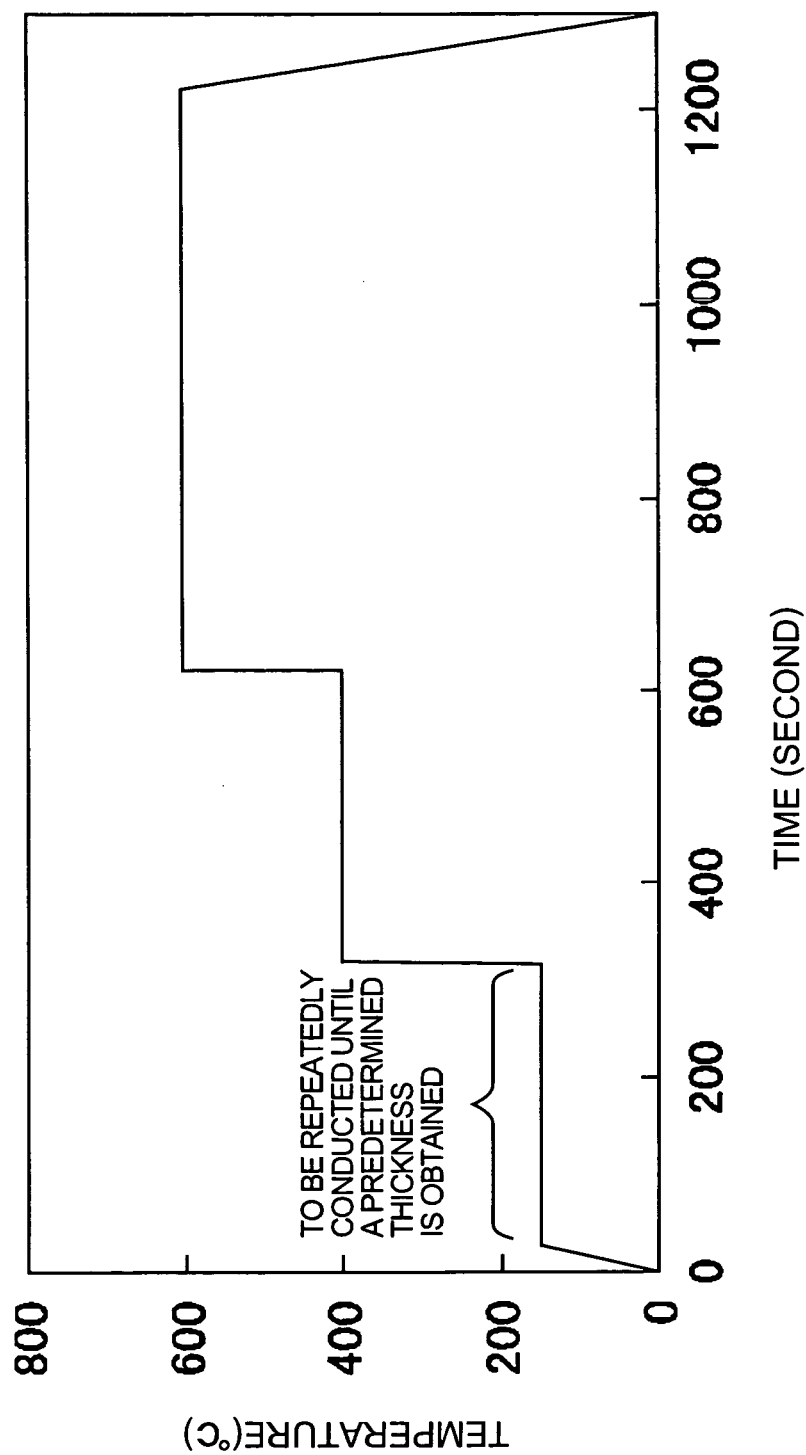
FIG. 3 is a graph showing the relationship between the temperature and time of the film-forming chamber of the film-forming apparatus, shown in FIG. 1, used in a thin-film forming process.

A method for forming a thin-film using the film-forming apparatus shown in FIG. 1 will now be described with reference to FIG. 3. FIG. 3 is a graph showing the relationship between the temperature and time of the film-forming chamber of the apparatus, shown in FIG. 1, used for forming thin-films.

This film-forming method is one of methods conducted in a pressurized, atmospheric, or decompressed atmosphere. In this method, carbon dioxide is used as supercritical fluid because the supercritical state can be readily achieved and carbon dioxide has high affinity to raw materials for films. However, the supercritical fluid used herein is not limited to carbon dioxide, and another type of fluid (for example, water) may be used. Advantage in using fluid in a supercritical state is that the raw materials can be sufficiently dissolved in such fluid having a large diffusion coefficient and the fluid can be readily sprayed due to the low density.

As shown in FIG. 1, the substrate 3 is placed on the substrate holder 2 and then retained thereto. The substrate 3 is maintained at room temperature. Subsequently, the valves 16, 17, 18, 19, and 20 are closed, the valve 15 and the pressure control valve 14 are opened, and the film-forming chamber 1, the siphon tubes 31, 32, and 39, and the mixer 7 are then evacuated to a vacuum pressure with the vacuum pump 6. In this procedure, the internal pressure of the film-forming chamber 1 is controlled with the pressure control valve 14, so that the film-forming chamber 1 has a predetermined pressure.

Next, the valve 15 is closed and the valves 16 and 17 are opened. The alcohol container 8 is pressurized by introducing Ar gas thereto from an Ar cylinder through the pipe 35, and thereby alcohol (for example, methanol, ethanol, or n-butyl alcohol) is fed to the mixer 7 in such a manner that the flow rate of the alcohol is controlled with the mass flow controller 25. The MO ingredient container 10 is pressurized by introducing Ar gas thereto from the Ar cylinder through the pipe 38, and thereby an MO ingredient (for example, Bi, La, Ti, Si, or Ge) is fed to the mixer 7 in such a manner that the flow rate of the MO ingredient is controlled with the mass flow controller 26. The alcohol and the MO ingredient are mixed in the mixer 7. Since the MO ingredient containing La or the like is difficult in handling when used alone, the MO ingredient is combined with the alcohol. When the MO ingredient is mixed with the alcohol just before the film-forming procedure, the MO ingredient can be prevented from deteriorating.

Next, the valves 16 and 17 are closed and the valve 19 is opened to introduce supercritical carbon dioxide (a temperature of 31° C. or more and a pressure of 7.38 MPa or more) into the mixer 7 from the $CO_2$ cylinder 11 through the siphon tubes 39 and 40. The supercritical carbon dioxide is mixed with the alcohol and the MO ingredient in the mixer 7 to prepare raw material fluid. Since the supercritical carbon dioxide has a large diffusion coefficient, the MO ingredient can be readily dissolved therein. The $CO_2$ cylinder 11, the siphon tubes 39 and 40, and the valve 19 are heated to 31° C. or more in advance with the heating means 29 such as a planar heater. Since these portions are heated to 31° C. or more, carbon dioxide in the $CO_2$ cylinder 11 is in a supercritical state. When the temperature is 31° C. or more and the pressure is 7.38 MPa or more, supercritical carbon dioxide can be obtained, as described above. The pressure of the $CO_2$ cylinder 11 is monitored with the pressure instrument 23.

Next, the valve 19 is closed and the valve 15 is opened. Thereby, the raw material fluid in the mixer 7 is fed through the siphon tubes 31 and 32 and then sprayed on the substrate 3 from the nozzle 5. In this procedure, the mixer 7, the siphon tubes 31 and 32, and the valve 15 are heated to 31° C. or more in advance with the heating means 28. Since these portions are heated to 31° C. or more, the raw material fluid can be prevented from adiabatically expanding. When the raw material fluid is sprayed, ultrasonic vibration is applied to either one or both of the nozzle 5 and the substrate holder 2 with the ultrasonic generators 13a and 13b. The rate of spraying the raw material fluid is preferably about 10–200 μl/min. There is an advantage in that supercritical fluid such as supercritical carbon dioxide can be readily sprayed because of the low viscosity. According to the above procedures, a thin-film is formed on the substrate 3.

As shown in FIG. 3, the substrate 3 is heated to 150° C. with the lamp heater 4 and then maintained at this temperature for five minutes. In this procedure, the valve 15 is closed and the valve 20 is opened to feed oxygen gas, the flow rate of which is controlled with the mass flow controller 27 and which is heated to a predetermined temperature with the heating means 30, to the film-forming chamber 1. The film-forming chamber 1 is preferably maintained at an atmospheric pressure to a pressure of $9.8 \times 10^5$ Pa. The reason to heat the oxygen gas is to prevent the temperature of the substrate surface from being decreased. That is, when the oxygen gas maintained at room temperature is fed, the temperature of the substrate surface is decreased because the oxygen gas cannot be readily heated, and therefore a thin-film having superior characteristics cannot be obtained.

The substrate 3 is rapidly heated by a RTA (Rapid Thermal Annealing) method. Thereby, the alcohol contained in the raw material fluid lying on the substrate 3 can be vaporized. The reason to combine the MO ingredient with the alcohol is as follows: when the fluid containing the raw material is placed on the substrate, the alcohol is rapidly vaporized, that is, an excessive solvent is removed, and thereby a thin-film having no porous portions and superior step coverage can be obtained. The raw material combined with the alcohol is herein used. However, raw materials need not be combined with alcohol. When the raw materials are not combined with alcohol, a step of evaporating alcohol is not necessary. Such raw materials that are not combined with alcohol include TEOS (tetraethylorthosilicate) and so on. Since there is a limit on the thickness of a thin-film obtained by spraying the mixture (raw material fluid) of raw materials only once, the step of spraying the above mixture and the step of heating a substrate may be repeatedly conducted a plurality of times depending on the required film thickness. Conditions for heating the substrate are not limited to a heating temperature of 150° C. and a heating time of five minutes as long as alcohol can be vaporized, and the heating temperature and heating time may be varied.

Next, the substrate 3 is heated to 400° C. with the lamp heater 4 by the RTA method and maintained at this temperature for five minutes. Thereby, the thin-film formed on the substrate is crystallized. Since the ultrasonic vibration is applied to at least one of the nozzle 5 and the substrate holder 2 while the raw material fluid is sprayed, as mentioned above, the crystallization is allowed to occur at such a low temperature of 400° C. The thin-film may be irradiated with ultraviolet rays or soft x-rays instead of applying the ultrasonic vibration after the raw material fluid is sprayed, thereby also allowing the crystallization to occur at a low temperature of 400° C. Static electricity generated on the substrate while the raw material fluid is, sprayed on the substrate can be removed by the application of the soft X-rays.

Next, the substrate 3 is heated to 600° C. with the lamp heater 4 by the RTA method and maintained at this temperature for ten minutes. The substrate 3 is then cooled to room temperature. According to the above procedures, the thin-film formed on the substrate 3 is obtained. Conditions for heating the substrate are not limited to a combination of a heating temperature of 400° C. and a heating time of five minutes and a combination of a heating temperature of 600° C. and a heating time of ten minutes. The heating temperature and time may be varied depending on the type and raw materials of desired thin-films.

A method for forming a thin-film under a pressurized condition will now be described. The same description as that of the film-forming method under the decompressed condition described above is omitted.

The substrate 3 is placed on the substrate holder 2 and then retained thereto. The substrate 3 is maintained at room temperature. Subsequently, the valves 16, 17, 19, and 20 are closed, the valves 15 and 18 and the pressure control valve 14 are opened, and nitrogen gas is introduced into the film-forming chamber 1, the siphon tubes 31, 32, and 39, and the mixer 7 from the nitrogen cylinder to purge contaminants from these portions. The pressure control valve 14 is closed to pressurize the film-forming chamber 1 to a predetermined pressure.

In the same manner as that of the above method for forming a thin-film under a decompressed condition, the alcohol is mixed with the MO ingredient in the mixer 7. After this procedure, in the same manner as that of the above method, the raw material fluid is sprayed on a substrate to form a thin-film thereon. Since the raw material fluid is sprayed on the substrate in a pressurized atmosphere, the raw material fluid is prevented from adiabatically expanding during spraying.

A method for forming a thin-film in a decompressed atmosphere using liquid carbon dioxide instead of supercritical carbon dioxide will now be described. The same description as that of the film-forming method performed in a decompressed atmosphere described above is omitted.

In order to prepare raw material fluid in the mixer 7, liquid carbon dioxide (for example, a temperature of 20° C. and a pressure of 5.733 MPa) is introduced into the mixer. In order to introduce liquid carbon dioxide thereinto, temperature-adjusting means is used instead of the heating means 28 and 29. The $CO_2$ cylinder 11, the siphon tubes 39 and 40, and the valve 19 are maintained at 20° C. with the temperature-adjusting means in advance. Thereby, carbon dioxide in the $CO_2$ cylinder 11 is maintained in a liquid state. The temperature and pressure of carbon dioxide are not limited to 20° C. and 5.733 MPa, respectively, and carbon dioxide under other conditions can be used.

When the raw material fluid is sprayed on a substrate, the mixer 7, the siphon tubes 31 and 32, and the valve 15 are maintained at 20° C. in advance with another temperature-adjusting means. Other procedures and conditions may be the same as those of the film-forming method described above.

According to the first embodiment described above, raw material fluid containing a raw material and supercritical fluid or liquid carbon dioxide is sprayed on a substrate, thereby forming a thin-film on the substrate.

In this embodiment, since alcohol and an MO ingredient are mixed just before the film-forming procedure, a thin-film can be formed on a substrate without causing the MO ingredient to be hydrolyzed. Low molecular-weight alcohol is preferably used herein. Thereby, when the fluid containing the raw material is placed on the substrate, the alcohol is rapidly vaporized, that is, an excessive solvent is removed, and thus a thin-film having superior step coverage can be obtained. Furthermore, since the quantity of the removed solvent can be controlled by adjusting the content of the low molecular-weight alcohol, the thickness of the thin-film can be readily controlled.

In this embodiment, since the ultrasonic generator 13 is used, ultrasonic vibration can be applied to the nozzle 5 while a mixture of raw materials is sprayed from the nozzle 5. Thereby, the nozzle 5 can be prevented form being plugged with the raw materials. As a result, the raw materials can be constantly fed.

In this embodiment, since the ultrasonic generator 13 is used, ultrasonic vibration can be applied to the substrate holder 2 while the mixture of raw materials is sprayed from the nozzle 5, thereby applying ultrasonic vibration to the substrate 3. Thereby, crystallization can be performed at a low temperature and therefore uniform crystal growth on the substrate surface can be performed. As a result, a thin-film having superior characteristics can be obtained. That is, crystallization can be performed at 400° C. using ultrasonic vibration.

Figure 4:
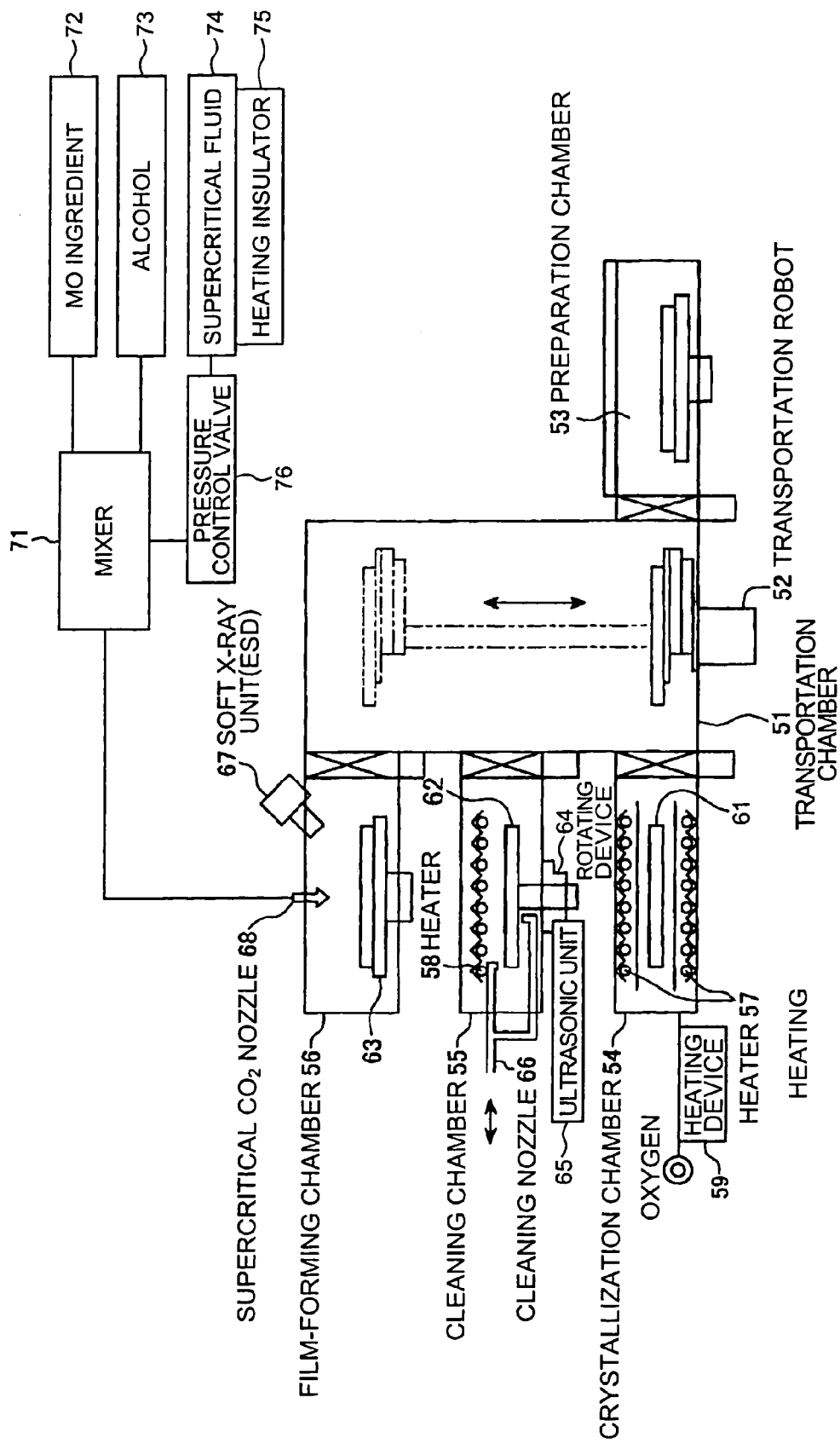
FIG. 4 is a schematic view showing a configuration of a film-forming apparatus for illustrating a modification of the first embodiment according to the present invention.

FIG. 4 is a schematic view showing a configuration of a film-forming apparatus for illustrating a modification of the first embodiment according to the present invention. In this modification, the following chambers are used: a chamber for forming a thin-film on a substrate and another chamber for crystallizing the thin-film.

As shown in FIG. 4, this film-forming apparatus includes a transportation chamber 51, a preparation chamber 53, a crystallization chamber 54, a cleaning chamber 55, and a film-forming chamber 56. A transportation robot 52 for transporting a substrate to each chamber is placed in the transportation chamber 51.

The film-forming chamber 56 has a substrate holder 63 therein, and a nozzle 68 is placed above the substrate holder 63 and is used for spraying raw material fluid containing alcohol, fluid in a supercritical state (supercritical fluid), and a condensation polymer (film ingredient) containing an element of a target metal oxide compound. The nozzle 68 is connected to a mixer 71, an MO ingredient container 72, an alcohol container 73, supercritical fluid 74 including a heating insulator 75, and a pressure control valve 76. A means for feeding the raw material fluid to the nozzle 68 is substantially the same as that of the first embodiment, and ther fore the description is omitted.

The film-forming chamber 56 includes a soft X-ray unit (ESD) for applying soft X-rays to a substrate retained to the substrate holder 63.

A substrate holder is placed in the preparation chamber 53.

Another substrate holder 62 is placed in the cleaning chamber 55, and a heater 58 is arranged above the substrate holder 62. The substrate holder 62 is connected to a rotating means 64 for rotating this holder. Furthermore, the substrate holder is connected to an ultrasonic unit 65 for applying ultrasound to this holder. The cleaning chamber 55 includes a cleaning nozzle 66 for cleaning the substrate retained to the substrate holder using alcohol. The cleaning nozzle 66 moves as indicated by the arrow and ejects the alcohol over the upper and lower surfaces of the substrate.

Another substrate holder 61 is placed in the crystallization chamber 54, and other heaters 57 are arranged above and below the substrate holder 61. The crystallization chamber 54 is connected to a means for supplying oxygen to this chamber. This means has a heating means 59, thereby heating supplied oxygen.

The transportation chamber 51, the preparation chamber 53, the crystallization chamber 54, the cleaning chamber 55, and the film-forming chamber 56 are each connected to a vacuum pump (not shown) for evacuating these chambers to a vacuum pressure.

A method for forming a thin-film using the film-forming apparatus shown in FIG. 4 will now be described.

A substrate is placed on the substrate holder in the preparation chamber 53, and the preparation chamber 53 is then preliminarily evacuated with the vacuum pump. The substrate is transported from the preparation chamber 53 to the film-forming chamber 56 with the transportation robot 52 in the transportation chamber 51 and then retained on the substrate holder 63 placed in the film-forming chamber 56.

The raw material fluid is sprayed on the substrate placed in the film-forming chamber 56 to form a thin-film. During this film-forming procedure, soft X-rays are applied to the substrate with the soft X-ray unit 67 to assist the film formation. The procedure of the spraying is substantially the same as that of the first embodiment described above. In this embodiment, the soft X-rays are used for assisting the film formation. However, ultraviolet rays and ultrasonic vibration can be used for the assistance in the same manner as that of the first embodiment described above.

The resulting substrate is transported from the film-forming chamber 56 to the cleaning chamber 55 with the transportation robot 52 in the transportation chamber 51 and then retained on the substrate holder 62 placed in the cleaning chamber 55. Alcohol is applied to the upper and lower surfaces of the substrate using a cleaning nozzle 66 to clean the substrate. When another thin-film having multilayer structure is formed, the substrate is heat-treated at 150° C. with the heater 58 in order to remove bubbles in this step.

The resulting substrate is transported from the cleaning chamber 55 to the crystallization chamber 54 with the transportation robot 52 in the transportation chamber 51 and then retained on the substrate holder 61 in the crystallization chamber 54. The substrate is heated to 400° C. with the heater 57 and then maintained at this temperature for five minutes. The resulting substrate is heated to 600° C. and then maintained at this temperature for ten minutes. Thereby, carbon in the MO ingredient is removed and the thin-film formed on the substrate is crystallized. Oxygen heated with the heating means 59 is fed to the crystallization chamber 54 according to needs. In order to increase the film thickness, the above procedures are repeatedly conducted until that the thin-film has a desired thickness.

In the above modification, the same advantages as those of the first embodiment according to the present invention can be obtained.

Figure 5:
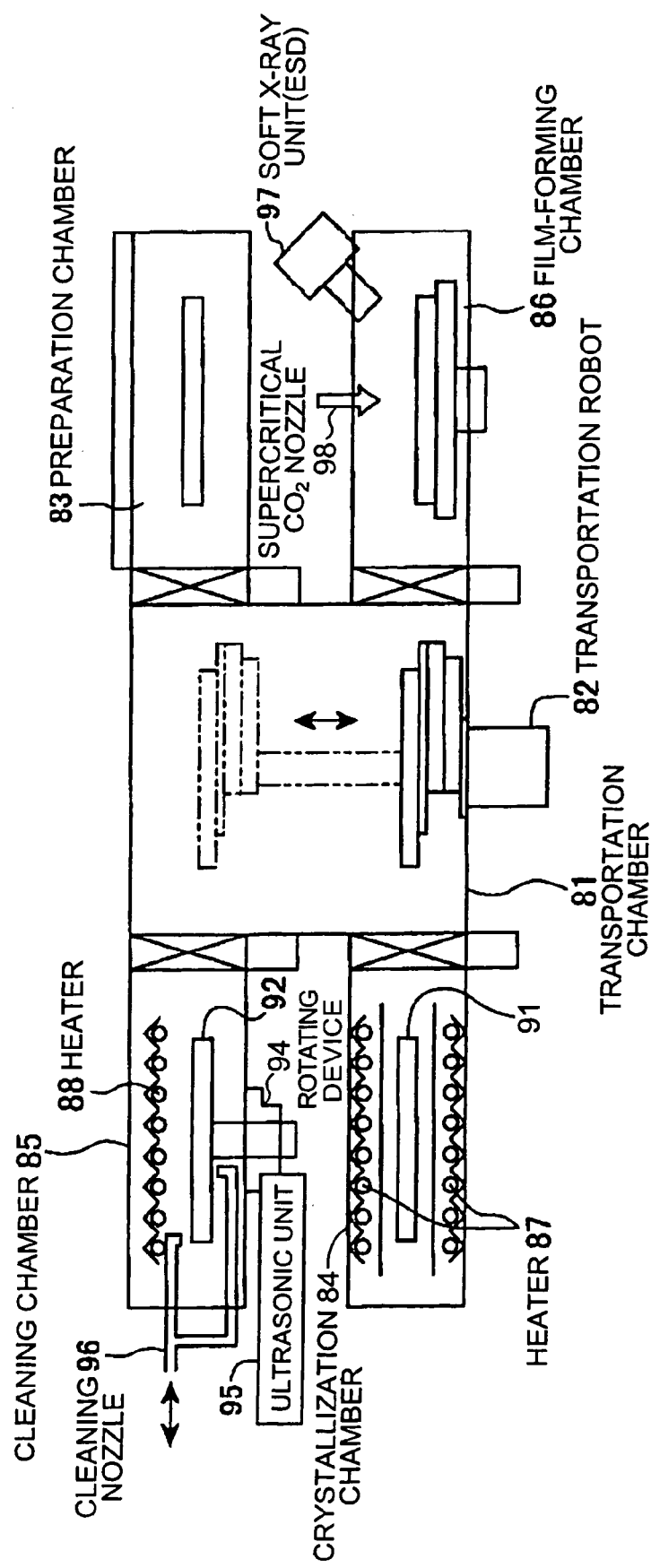
FIG. 5 is a schematic view showing a configuration of a film-forming apparatus for illustrating another modification of the first embodiment according to the present invention.

FIG. 5 is a schematic view showing a configuration of a film-forming apparatus for illustrating another modification of the first embodiment according to the present invention. In this modification, the following chambers are used: a chamber for forming a thin-film on a substrate and another chamber for crystallizing the thin-film.

As shown in FIG. 5, the film-forming apparatus includes a transportation chamber 81, a preparation chamber 83, a crystallization chamber 84, a cleaning chamber 85, and a film-forming chamber 86. The difference between this apparatus and the apparatus shown in FIG. 4 is principally the arrangement of the chambers.

A transportation robot 82, a nozzle 98, a soft X-ray unit (ESD) 97, substrate holders 91 and 92, heaters 87 and 88, a rotating means 94, an ultrasonic unit 95, and a cleaning nozzl 96, shown in FIG. 5, are substantially the same as the transportation robot 52, the nozzle 68, the soft X-ray unit (ESD) 67, the substrate holders 61 and 62, the heaters 57 and 58, the rotating means 64, the ultrasonic unit 65, and the cleaning nozzle 66, respectively, shown in FIG. 4.

The film-forming chamber 86 has the substrate holder 83 therein, and the nozzle 98 is placed above the substrate holder 83 and is used for spraying raw material fluid containing alcohol, fluid in a supercritical state (supercritical fluid), and a condensation polymer containing an element of a target metal oxide compound. In such a manner as the above modification, the nozzle 98 is connected to a mixer, an MO ingredient container, an alcohol container, supercritical fluid including a heating insulator, and a pressure control valve. A means for feeding the raw material fluid to the nozzle 98 is substantially the same as that of the above modification.

A method for forming a thin-film using the film-forming apparatus shown in FIG. 5 is substantially the same as that of the above modification, and therefore the description thereof is omitted.

In the above modification, the same advantages as those of the first embodiment can be obtained.

The present invention is not limited to the above embodiments, and various modifications may be performed. For example, various raw materials can be used depending on thin-film properties. A film-forming chamber preferably has a small volume, and therefore a small-volume chamber can be used. The reason that such a film-forming chamber having a small volume is preferable is described below. When supercritical fluid is sprayed from a nozzle, the raw material fluid adiabatically expands to have a larger volume in proportion to the volume of the film-forming chamber and thereby the temperature of the raw material fluid is decreased. If the temperature is significantly decreased, the sprayed raw material fluid is solidified. Solid raw materials adhering to a substrate do not provide a high-quality thin-film. Thus, when a film-forming chamber having a small volume is used, the raw material fluid can be securely prevented from decreasing in temperature due to adiabatic expansion.

An exemplary film-forming chamber having a small volume includes a substrate-housing portion for housing a substrate holder for retaining a substrate and a channel-housing portion for housing a channel for feeding raw material fluid to the substrate, wherein the channel-housing portion is designed to have a minimum volume. The substrate-housing portion and the channel-housing portion are connected to each other in the chamber. When the region of connecting these portions has an area smaller than that of the substrate surface, a thin-film cannot be formed over the substrate surface at one stroke. It is preferable that the chamber further includes a substrate-rotating means for rotating the substrate and thereby a thin-film is formed over the substrate surface while the substrate is rotated. A thin-film having a uniform thickness can be obtained by optimizing the relationship between the position of a nozzle and the axis of rotation of the substrate.

A second embodiment of the present invention will now be described.

A condensation polymer used for forming a ferroelectric thin-film is described below. In general, in order to form oxide thin-films containing a ferroelectric material and so on, so-called sol-gel solution containing the following components is used: an organic solvent such as alcohol, and a solute, such as metal alkoxide, an organic salt, or an inorganic salt, dissolved in the solvent. In semiconductor-manufacturing processes, such metal alkoxide is employed in most cases. This is because the metal alkoxide has a certain vapor pressure and therefore can be readily purified by a heating (distillation) process under reflux. Furthermore, the metal alkoxide can be readily dissolved in an organic solvent such as alcohol and reacts with water to produce oxide gel or precipitate. Furthermore, a metal oxide can be obtained by firing the metal alkoxide in an oxidative atmosphere.

A metal element contained in the metal alkoxide specified in the present invention includes metalloids such as Si; alkali metals such as K, Li, and Na; alkaline-earth metals such as Ba, Ca, Mg, and Sr; Group III elements such as Al, B, and In; Group IV elements such as Si, Ge, and Sn; Group V elements such as P, Sb, and Bi; transition elements such as Y, Ti, Zr, Nb, Ta, V, and W; lanthanoids such as La, Ce, and Nd.

Figure 6:
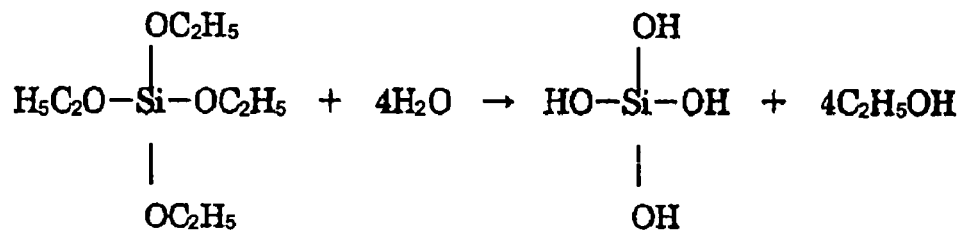
FIG. 6 is an illustration showing the chemical reaction formulas of hydrolysis, bimolecular condensation, and linear condensation polymerization.
Figure 6:
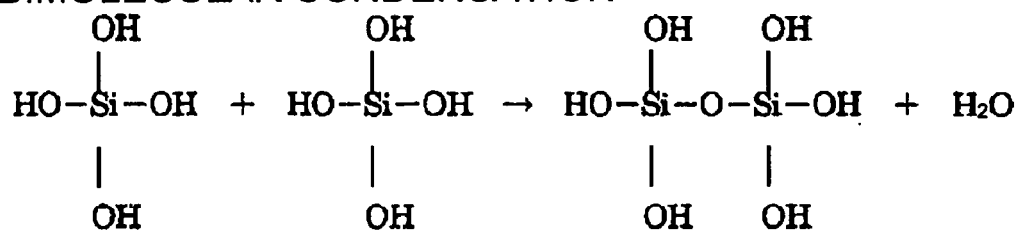
Figure 6:
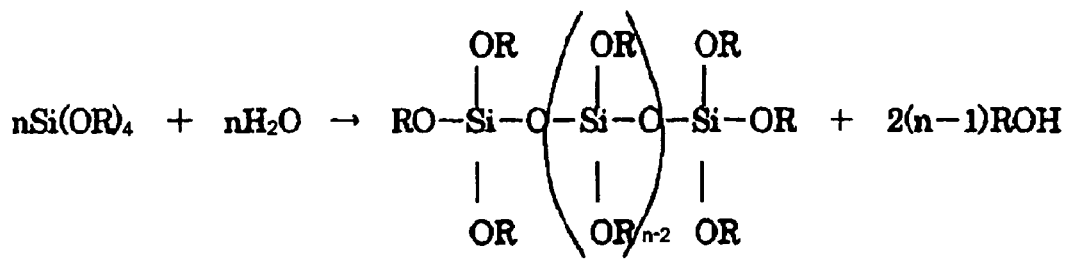

Advantages in using the metal alkoxide as a starting material is described below using Si as an example. As shown in FIG. 6, "the molecular length (size) n" can be controlled in such a manner that polycondensation reaction is controlled by conducting a partial hydrolysis reaction. That is, the polycondensation reaction of metal alkoxide can be controlled by adding a known quantity of water to the reaction.

In a film-forming apparatus according to the present invention, raw material solution is applied onto a substrate just after the preparation of this solution to form a thin-film, wherein the solution is prepared by completely dissolving the condensation polymer of the metal alkoxide, obtained using a known quantity of water, in a supercritical fluid. Alkoxides containing Pb, Zr, and Ti instead of Si are subjected to a polycondensation reaction (partial hydrolysis reaction) in a mixed manner to obtain a condensation polymer used for forming a so-called $Pb(Zr, Ti)O_3$ (PZT) ferroelectric material, in which elements are connected to each other with an oxygen atom therebetween. The raw material solution is prepared by completely dissolving this condensation polymer in the supercritical fluid. Just after the preparation of this solution, the solution is applied onto a substrate, thereby obtaining a PZT ferroelectric thin-film.

A method for preparing a PZT condensation polymer used in the present invention will now be described. This embodiment is illustrated using a system consisting of metal alkoxide and metal carboxylate as an example. In this embodiment, lead acetate $((CH_3CO_2)_2Pb \cdot 3H_2O)$ is used as a starting material containing lead (Pb), titanium tetraisoisopropoxide $((CH_3)_2CHO)_4Ti)$ is used as a starting material containing titanium (Ti), and zirconium n-butoxide $((CH_3(CH_2)_3O)_4Zr)$ is used as a starting material containing zirconium (Zr).

As described above, it is the key to adjusting the polymerization degree of products, obtained by a hydrolysis and polycondensation reaction, by adding an adjusted quantity of water. Thus, water of crystallization, that is, $3H_2O$ in the compound $(CH_3CO_2)_2Pb.3H_2O$, is not necessary. Therefore, the compound $(CH_3CO_2)_2Pb.3H_2O$ is dehydrated, that is, this compound is heated under reflux with the compound $CH_3O(CH_2)_2OH$ so that water is separated as an azeotropic mixture containing a solvent. Viscous liquid obtained by removing water has a chemical formula $CH_3CO_2PbO(CH_2)_2OCH_3.XH_2O$, which is formed by replacing an acetyl group (CH3CO2—) of the compound $(CH_3CO_2)_2Pb.3H_2O$ with a 2-methoxyethoxy group $(CH_3O(CH_2)_2O-)$, wherein X<0.5. In this replacement reaction, an ester $(CH_3CO_2(CH_2)_2 OCH_3)$ and water $(H_2O)$ result from acetic acid $(CH_3CO_2H)$ and the compound $CH_3O(CH_2)_2OH$.

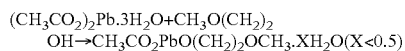

Next, the compound $((CH_3)_2CHO)_4Ti$ is dissolved in the compound $CH_3O(CH_2)_2OH$ so that the following alcohol interchange reaction occurs. When the solvent is not sufficient, a mixture containing a monomer to a tetramer is formed. Whole or a part of an isopropoxy group $((CH_3)_2(CHO-)$ of $((CH_3)_2CHO-)_4Ti$ is replaced with a 2-methoxyethoxy group.

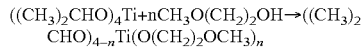

(n is equal to 1–4)

When the compound $(CH_3(CH_2)_3O)_4Zr$ is dissolved in the compound $CH_3O(CH_2)_2OH$, the alcohol interchange reaction occurs in the same manner as the above.

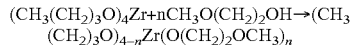

(n is equal to 1–4)

Gel prepared by mixing these three liquids is placed in an ingredient container 1 of a film-forming apparatus according to the present invention. A known quantity of water placed in another ingredient container 2 is added to these molecules to control the hydrolysis reaction, thereby obtaining molecules having higher molecular weight. Such molecules are used as a condensation polymer for forming a PZT ferroelectric thin-film. The obtained solution contains the following polymer.

[CF1]

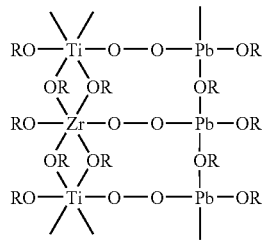

Methanol or ethanol is added to the solution containing the condensation polymer gel for forming a PZT ferroelectric thin-film to adjust the viscosity, and the resulting solution is mixed with supercritical fluid having high dissolving ability. The mixture is applied onto a substrate to form an amorphous PZT ferroelectric thin-film. This thin-film is then heated in an oxidative atmosphere to crystallize the thin-film, thereby obtaining a desired PZT ferroelectric thin-film.

In this embodiment, the above condensation polymer for forming the ferroelectric thin-film, methanol, and supercritical fluid are mixed at the ratio of 1:1:1. This mixture is applied onto an Si substrate covered with Pt, and the resulting substrate is then preliminarily fired at 400° C. in the atmosphere, thereby forming an amorphous PZT thin-film having a thickness of 5 nm.

Figure 7:
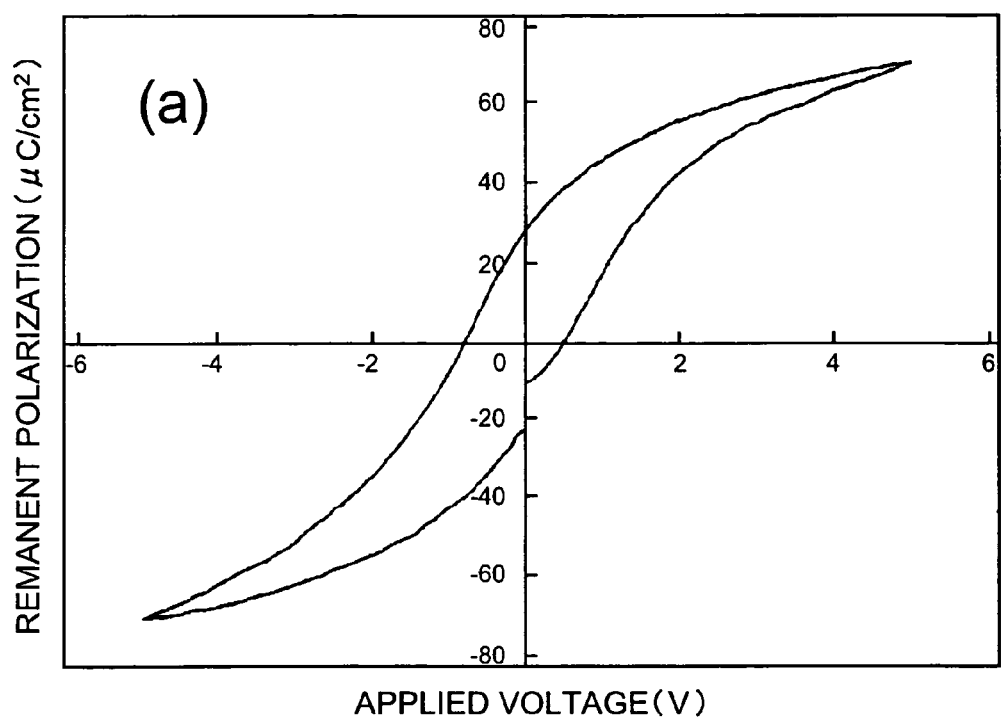
FIG. 7($a$) is an illustration showing a ferroelectric property of an upper Pt electrode formed on a PZT thin-film by a deposition method.
Figure 7:
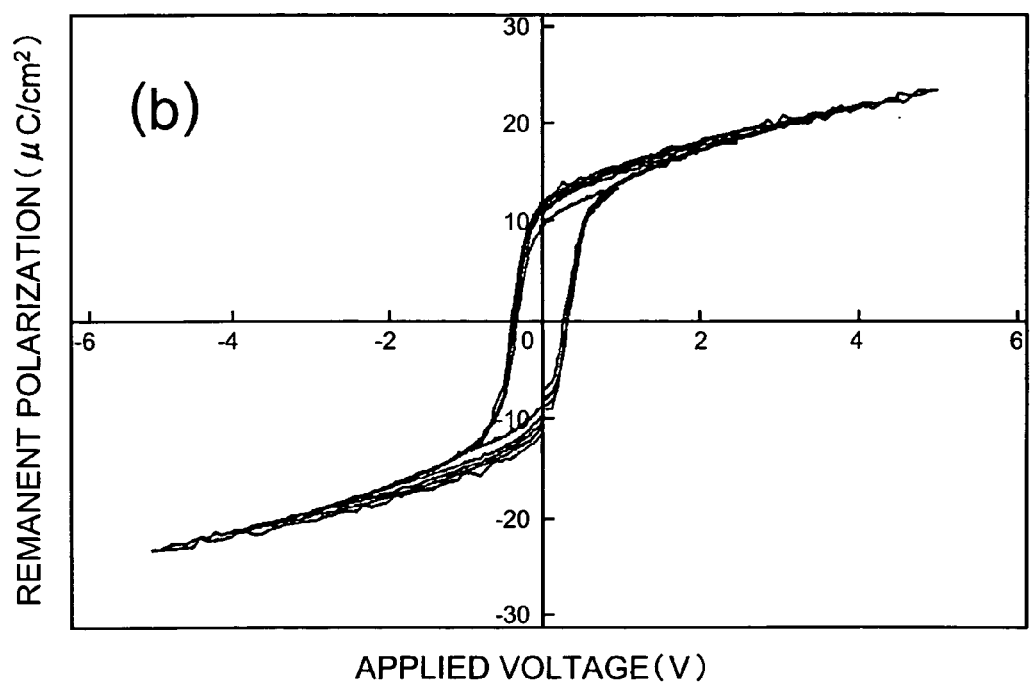

The above procedure is repeated 14 times, and the crystallization is then conducted at 600° C. in an oxygen atmosphere, thereby forming a PZT thin-film having a thickness of 70 nm. An upper Pt electrode having a diameter of 100 μmϕ and a thickness of 100 nm is then formed on the PZT thin-film by a deposition method. FIG. 7(a) is an illustration showing the ferroelectric property.

Another thin-film is formed using raw material solution prepared by mixing an SBT condensation polymer, ethanol, and supercritical $CO_2$ at the ratio of 1:1:1 in the same manner as the above. FIG. 7(b) is an illustration showing the ferroelectric property.

The invention claimed is:

1. A method of forming a ferroelectric film, comprising:
    allowing a substrate holder to support a substrate;
    producing a first mixture by mixing a condensation polymer containing an element of metal oxide compound and alcohol;
    after producing the first mixture, producing a second mixture by mixing supercritical fluid or liquid carbon dioxide and the first mixture;
    applying the second mixture on a surface of the substrate;
    converting the applied second mixture into a ferroelectric film by crystallizing the second mixture; and
    after applying the second mixture and before converting the applied second mixture into the ferroelectric film, cleaning the substrate by applying alcohol to upper and lower surfaces of the substrate.

2. The method of forming a ferroelectric film according to claim 1, further comprising applying soft X-rays to the substrate, during the applying the second mixture on a surface of the substrate.

3. The method of forming a ferroelectric film according to claim 1, wherein applying alcohol to upper and lower surfaces of the substrate comprises applying alcohol to whole upper and whole lower surfaces of the substrate.

4. The method for forming a ferroelectric film according to claim 1, further comprising, while crystallizing the second mixture, applying oxygen in a crystallizing chamber.

* * * * *

UNITED STATES PATENT AND TRADEMARK OFFICE
CERTIFICATE OF CORRECTION

PATENT NO. : 7,074,548 B2 Page 1 of 1
APPLICATION NO. : 10/376253
DATED : July 11, 2006
INVENTOR(S) : Takeshi Kijima, Eiji Natori and Etsuo Suzuki It is certified that error appears in the above-identified patent and that said Letters Patent is hereby corrected as shown below:

ON THE COVER PAGE:

Section (54), please amend the title as follows:

~~APPARATUS AND~~ METHOD ~~FOR~~ OF FORMING A THIN-FILM

Signed and Sealed this

Thirtieth Day of January, 2007

JON W. DUDAS
*Director of the United States Patent and Trademark Office*